United States Patent [19]

Smith

[11] Patent Number: 4,652,032
[45] Date of Patent: Mar. 24, 1987

[54] VEHICLE BUMPER ASSEMBLY

[75] Inventor: Robert J. Smith, Parkersburg, W. Va.

[73] Assignee: Borg-Warner Chemicals, Inc., Parkersburg, W. Va.

[21] Appl. No.: 787,934

[22] Filed: Oct. 16, 1985

[51] Int. Cl.$^4$ ............................................. B60R 19/00
[52] U.S. Cl. ..................................... 293/120; 293/133
[58] Field of Search ............... 293/102, 120, 122, 133, 293/136, 117

[56] References Cited

U.S. PATENT DOCUMENTS

| 3,666,310 | 5/1972 | Burgess et al. | 293/120 |
|---|---|---|---|
| 3,690,710 | 9/1972 | Curran | 293/120 |
| 3,734,557 | 5/1973 | McKenzie | 293/120 |
| 3,829,141 | 8/1974 | Igwe | 293/120 |
| 3,938,840 | 2/1976 | Haase et al. | 293/120 |
| 3,944,271 | 3/1976 | Eggert, Jr. | 293/120 |
| 4,134,610 | 1/1979 | Lindewall | 293/120 |
| 4,171,143 | 10/1979 | Huber et al. | 293/121 |
| 4,208,069 | 6/1980 | Huber et al. | 293/102 |
| 4,241,945 | 12/1980 | Huber et al. | 293/120 |
| 4,320,913 | 3/1982 | Kuroda | 293/120 |
| 4,348,042 | 9/1982 | Scrivo | 293/120 |
| 4,457,547 | 7/1984 | Sekiyama | 293/120 |
| 4,466,646 | 8/1984 | Demastro et al. | 293/117 |

Primary Examiner—Robert R. Song
Attorney, Agent, or Firm—Emily A. Richeson

[57] ABSTRACT

A vehicle bumper assembly is provided which comprises a substantially tubular reinforcing beam, a face cover, and a means for attaching said face cover to said reinforcing beam such that the reinforcing beam includes a material which has a flexural modulus at 72° F., according to ASTM Standard D-790 (0.05 in./min.) of about 100,000 psi to about 500,000 psi and a deflection temperature according to ASTM Standard D-698 (264 psi) $\frac{1}{4}''$ thick samples of at least 155° F. The present invention also includes a process for making a vehicle bumper assembly comprising the steps of molding a first material to form a face cover; extrusion molding a second material to form a tubular section; blow molding said tubular section to form a substantially tubular reinforcing beam having means adapted for attaching said reinforcing beam to a vehicle; and attaching said face cover to said reinforcing beam.

13 Claims, 5 Drawing Figures

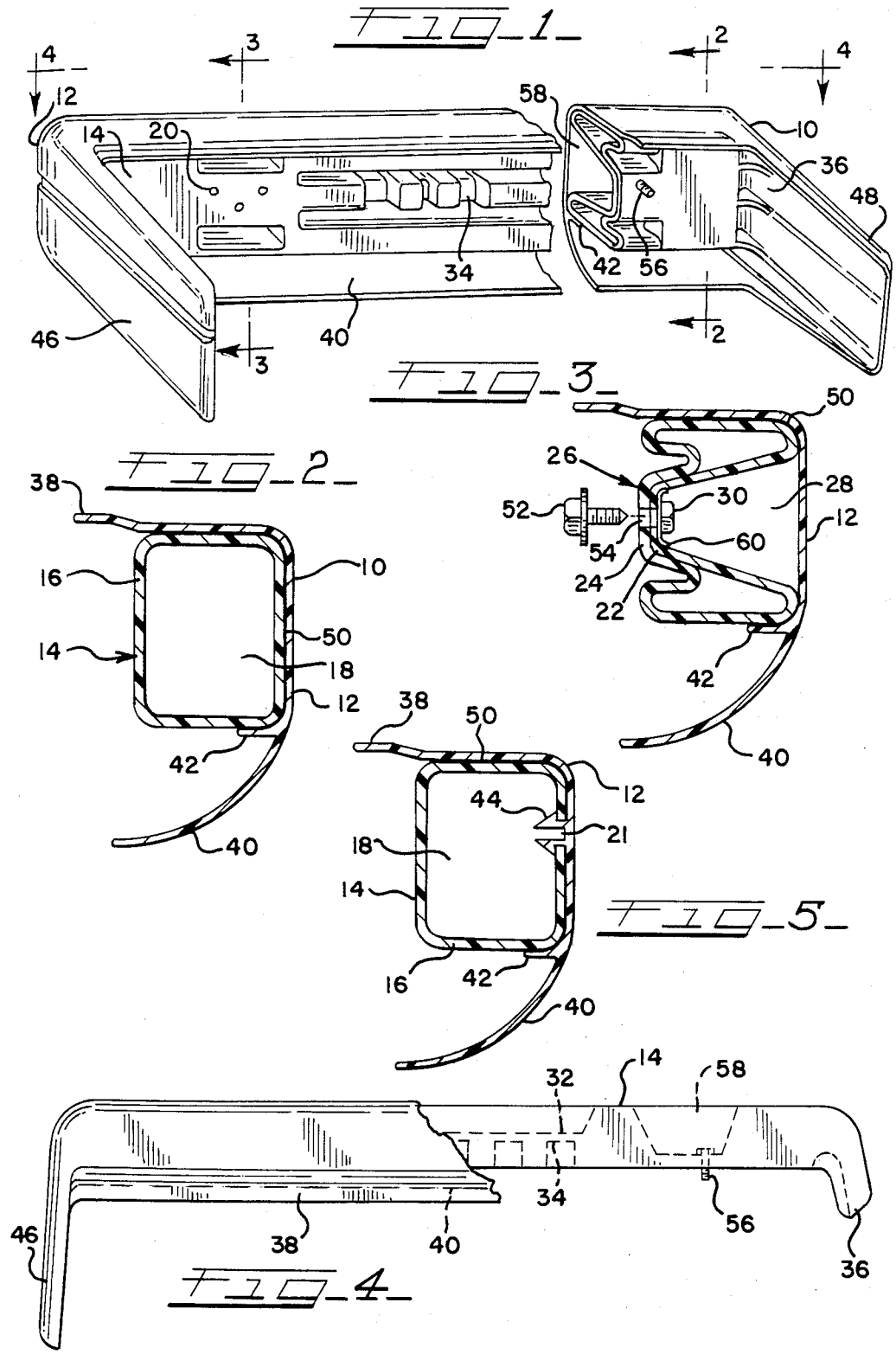

VEHICLE BUMPER ASSEMBLY

The present invention relates to vehicle bumper assemblies in general, and to plastic vehicle bumper assemblies in particular.

Over the years, vehicle bumpers have been made of a variety of materials. Until relatively recently, steel bumpers are predominantly used, although wooden replacement bumpers could occasionally be found on vehicles in certain rural and urban areas, especially at times, such as immediately after World War II, when steel was in short supply.

Although steel bumpers have the benefit of being stronger than bumpers made of most alternative materials, steel bumpers are generally heavier than their plastic, rubber or wooden counterparts, resulting in reduced fuel economy for the vehicle to which they are attached. In addition, steel bumpers usually must be plated or coated by a corrosion resistant material to prevent or retard deterioration. It is in part for these reasons that much attention has recently been devoted to developing vehicle bumpers which utilize synthetic materials, such as thermoplastic and thermosetting resins, elastomers and foams. Of particular interest are bumpers which employ thermoplastic materials, as these bumpers may offer significant improvements over thermoset materials.

A variety of bumpers employing synthetic materials are known in the art. Such bumpers are disclosed by U.S. Pat. Nos. 4,134,610 by Lindewall; 3,666,310 to Burgess, et al.; 3,944,271 to Eggert; 3,690,710 to Curran; 3,938,840 to Haase et al.; 3,829,141 to Igwe; 3,734,557 to McKenzie; 4,320,913 to Kuroda; 4,171,143, 4,208,069 and 4,241,945 to Huber et al.; and 4,466,646 to Delmastro et al.

As is known in the art, "cosmetic bumpers" are bumpers which are designed to provide a pleasing appearance, yet are not intended to absorb a significant amount of energy upon impact of the vehicle with another object. A bumper which is designed to absorb a significant part of the energy from a collision is called a "structural bumper", and the portions of the bumper which serve in impact management, versus merely providing a pleasing appearance, are called "structural components". As illustrated by the patents referenced above, although thermoplastic materials have previously been used as cosmetic components in bumper systems which use steel members for strength or impact management, very few bumper designs employ thermoplastic materials as structural components.

One thermoplastic structural design, very similar in some respects to the basic design disclosed by U.S. Pat. No. 4,348,042 to Scrivo, is currently used on production models of some automobiles. The Scrivo patent discloses a front cover and a reinforced mounting beam which are formed from separate pieces of sheet metal and welded together. In similar thermoplastic designs, both the front cover and the beam are made in separate operations from injection molding a thermoplastic resin. The front cover and the reinforcing beam are then joined together by linear welding and the assembled bumper attached to a car.

Linear welding is a process for fixedly joining together thermoplastic parts by rubbing the parts rapidly together along the intended weld line. The resulting friction generates heat, which causes the plastic along the intended weld line to melt. The parts are then held in the desired position and allowed to cool. This causes the melted plastic to solidify, thereby bonding the two parts together.

Unfortunately, however, linear welding of thermoplastic parts have been shown to result in significantly reduced chemical resistance of the thermoplastic material in the area of the weld. Although linear welding may result in a structurally acceptable bond, this procedure has other disadvantages as well.

Unlike other means of fixing two plastic parts together, linear welding has the disadvantage of requiring the use of a linear welding machine. Linear welding machines generally are bulky, and may take up space in a facility which could be productively devoted to other operations. Linear welders also require substantial capital outlays for equipment and maintenance, and may require the use of specially skilled personnel for operation, thereby adding considerably to the cost of the overall product. A further disadvantage is that welding locally stresses the parts, which may reduce the overall strength of the design.

Due to the fact that linear welding requires that the parts melt at exactly the same temperature, all parts to be welded together must be made of the same material. Although this fact might not be a disadvantage for other designs, it is a significant disadvantage for bumpers, such as those analogous to that of Scrivo, wherein the front cover serves both a decorative and a structural function. It is generally desired that the visible portion of a bumper have a smooth, even appearance, with the surface preferably being suitable for painting or plating by materials such as chrome. However, many of the thermoplastic materials which have optimal surface characteristics are not sufficiently impact resistant to make them suitable for use in structural parts. Separation of structural and decorative functions is therefore desirable to permit greater freedom in the selection of appropriate materials.

Separation of decorative and structural functions is also advantageous in that many thermoplastics suffer significant degradation upon prolonged exposure to ultraviolet (UV) light. As virtually all vehicle bumpers are subject to such exposure in the course of routine use, bumpers with exposed structural components, such as in designs analogous to that of Scrivo, are more prone to failure than other bumpers, such as that of the present invention, wherein at least one component is devoted to decoration and to shielding of the structural components from UV radiation.

As is apparent from the art, structural bumpers usually manage impact by providing a resistant component which absorbs energy by crushing, collapsing, the creation of micro fissures in the structural material, or otherwise deforming upon impact. Resistant components may be formed as a one piece block of rubbery material, in the case of elastomer-type structural components, by merely filling a mold with thermosetting material and subjecting the material to appropriate temperature conditions. In the past, for bumpers wherein the structural component was thermoplastic, the structural component was usually made by injection molding. However, due to typical injection molding problems, such as difficulties with gating and mold filling, which increase with the size and intricacy of a mold, the structural component was made from two or more separately injection molded pieces.

Although injection molding has many advantages over some other type of molding, the fact that the prior art procedure requires the formation of at least two separate pieces which must later be joined results in a manufacturing inefficiency which increases with the number of separate pieces required. Formation of the structural component as one piece therefore offers many advantages over processes known in the art.

A further disadvantage of injection molded thermoplastic bumpers is that injection molding of a large elongate part, such as a part of a reinforced structural member or a face plate for a bumper, usually results in the knit lines in the molded part being vertical due to the gate positions required to adequately fill the mold. As failure of a part upon impact frequently occurs along the knit lines, matching an injection molded structural component with an injection molded face cover may be expected to result in an part which is prone to failure along a vertical axis. However, extrusion molding of a long part generally results in the knit lines being horizontal. Matching an extrusion molded structural component with an injection molded face cover, as in the present invention, has the advantage of causing the knit lines of one piece to be positioned perpendicular to the knit lines of the other, making the assembled part less susceptible to failure.

SUMMARY OF THE INVENTION

The present invention is a vehicle bumper assembly which comprises a substantially tubular thermoplastic reinforcing beam, a face cover, and a means for attaching said face cover to said reinforcing beam. According to the invention, the reinforcing beam includes a material which has a flexural modulus at 72° F., according to ASTM Standard D-790 (0.05 in./min.), of about 100,000 psi to about 500,000 psi and a deflection temperature according to ASTM Standard D-698 (264 psi) ⅛" thick samples of at least 155° F.

The present invention also includes a process for making a vehicle bumper assembly comprising the steps of:
(a) molding a first material to form a face cover;
(b) extrusion molding a second material to form a tubular section;
(c) blow molding said tubular section to form a substantially tubular reinforcing beam;
(d) attaching said face cover to said reinforcing beam.

BRIEF DESCRIPTION OF THE DRAWINGS

The present invention may be readily understood by reference to the following detailed description when considered in connection with the accompanying drawings wherein:

FIG. 1 is a partially cut away rear perspective view of the vehicle bumper assembly of the present invention;

FIG. 2 is a cross-sectional view along the line 2—2 of the embodiment of FIG. 1;

FIG. 3 is a cross-sectional view along the line 3—3 of the embodiment of FIG. 1;

FIG. 4 is a top view, partially cut away, of the embodiment depicted in FIG. 1;

FIG. 5 is a cross-sectional view of an alternative embodiment.

DETAILED DESCRIPTION OF THE INVENTION

Referring now to FIG. 1, the present invention is a vehicle bumper assembly represented generally in the drawing at 10. This bumper assembly comprises a face cover 12, a reinforcing beam 14, and means for attaching the face cover to the reinforcing beam.

The reinforcing beam 14 is an elongate article of appropriate dimensions. Referring to FIG. 2, this beam has a wall 16 which defines an internal cavity or lumen 18. Although wall 16 of reinforcing beam may have some local discontinuity, such as bolt hole 20 in FIG. 1 or snap fitting aperture 21, wall 16 is substantially continuous. The thickness of wall 16 will vary depending on the plastic selected, the size and weight of vehicle for which the bumper assembly is intended and other factors. However, for most embodiments wall 16 preferably should be about 0.1 in. to about 0.25 in. thick.

Various portions of wall 16 may be expanded or collapsed to provide functional adaptations. Referring to FIG. 3, a first portion 22 of wall 16 maybe deformed to approximate a second portion 24 of wall 16 to provide contact between opposing wall surfaces and to form a mounting rib 26. As detailed below, wall portions 22 and 24 maybe pierced to allow introduction of a fastening means to aid in attaching the vehicle bumper assembly to a vehicle. Deformation of wall portion 22 results in the formation of pocket 28 which may contain fastening or attachment means such as nut 30. Referring to FIG. 4, other portions of wall 16 may also be locally deformed to form one or more reinforcing ribs to provide the beam with structural reinforcement, such as by a third portion 32 and fourth portion 34 of wall 16 approximating each other.

Referring to FIG. 1, although formation of reinforcing beam 14 by blow molding, according to the process of the present invention, will usually result in the terminal portions of the reinforcing beam, such as beam end 36, being closed, it is contemplated that lumen 18 of the reinforcing beam communicate directly with the external atmosphere, such as through bolt hole 20, so that the pressure inside the lumen is always approximately atomspheric. Although the lumen 18 and/or indented areas such as pocket 28 may be filled with a reinforcing foam, such as a polyurethane foam to provide additional means for energy absorption upon impact, this is not preferred.

It is critical to the invention that the reinforcing beam be non-elastomeric with respect to its physical properties, yet provide significant impact management rather than merely transmitting the energy of impact to the vehicle. It is therefore critical to the invention that the reinforcement beam include a material which has a flexural modulus at 72° F., according to ASTM Standard D-790 (0.05 in./min., compression molded sample) of about 100,000 psi to about 500,000 psi, and preferably about 200,000 psi to about 400,000 psi.

This means that although the beam material may be one which contains elastomeric substances, for example ABS plastics which contain a rigid phase grafted to a rubbery one, the reinforcing beam does not have the compressibility or an elastomer, such as natural or synthetic rubber, so that the reinforcing beam offers substantial resistance to and absorption of impact rather than merely compressing as some foam or ealstomeric bumpers known in the art. However, while steel and theremoset reinforced plastics have flexural moduli of more than 1 million psi, the flexural modulus of the beam material is much less. This enables the reinforcing beam to flex without breaking while absorbing a significant portion of the energy from impact with another object instead of transmitting virtually all of the energy to the vehicle, as do conventional bumpers with structural components made of steel. Although most conventional bumpers rely on energy absorption by shock absorbers between the vehicle body and bumper assembly, the energy absorbing properties of the reinforcing beam of the invention may allow the performance criteria for the shock absorbers to be lowered, or may permit the shock absorbers to be eliminated entirely.

It is also critical to the invention that the beam material be one with a deflection temperature, according to ASTM D-698 (264 psi), ¼" thick samples of at least 155° F., and preferably at least 180° F., so that the reinforcing beam is relatively rigid under normal conditions of use.

Materials suitable for use in the reinforcing beam generally are thermoplastic resins. Many suitable resins are known in the art, and may include ABS copolymer resins, polyamides, impact modified polyolefins, diallyl phthalates, polyesters, polycarbonates and polyphenylene ethers or various blends and combinations thereof. Preferably, the reinforcing beam material is an ABS copolymer resin, a polycarbonate resin, or a polyphenylene ether resin or various blends or allow thereof. ABS copolymer resins are most preferred. As is known in the art, these plastics may include other substances, such as antioxidants, stabilizers, reinforcing fillers such as elastomeric particles, and extenders, such as talc, glass, kaolin, and calcium carbonate, to extend the plastic material and/or to enhance desirable properties.

Referring to FIG. 2, face cover 12 is a relatively thin, elongate member which conceals the reinforcing beam 14 from view and from direct exposure to sunlight when the vehicle bumper assembly 10 is attached to a vehicle. This face cover may include an upper skirt 38 which extends between the reinforcing beam 14 and the vehicle body (not shown). A lower skirt 40, which extends beneath the reinforcing beam 14, may also be included.

The inside of the face cover also preferably includes a rim 42 along at least a portion of the inside of the face cover to aid in seating the reinforcing beam 14 inside face cover 12. In an alternative embodiment depicted in FIG. 5, portions of the inside of the face cover may also be adapted to form one or more fasteners such as snap fitting 44 to aid in affixing face cover 12 to reinforcing beam 14.

Referring to FIG. 1, face cover 12 also preferably has a generally L-shaped section at each end, shown at 46 and 48, which extends over the end of reinforcing beam 14 and along a portion of the vehicle body when the bumper assembly is attached, such as L-shaped section 48 extending over end 36.

The face cover may have the effect in a collision of distributing the force of the impact over a wider area of the reinforcing beam. However, as the face cover is required to only function decoratively and to shield the reinforcing beam from sunlight, rather than structurally by providng significant impact absorption, the material composing the face cover need not be one which provides significant energy absorption. In the preferred embodiment, the face cover includes a synthetic material, such as a thermoplastic resin or relatively firm elastomer which has a flexural modulus according to ASTM Standard D-790 (0.05 in./min., compression molded sample) at 72° F. of about 75,000 psi to about 500,000 psi. Thermoplastic resins having a flexural modulus at 72° F. of about 100,000 to about 400,000 are preferred, such as resins containing elastomeric impact modifiers, such as ABS copolymer materials. It is also preferred that the face cover material have a deflection temperature, according to ASTM Standard D-648 (264 psi) ¼" thick samples of at least 155° F., and more preferably at least 170° F.

Although the face cover material may be the same thermoplastic resin as that selected for the reinforcing beam, this is not necessary. Indeed, given the different functions of the face cover and the reinforcing beam, plastics which are more desirable for one application may be less desirable for the other. In any event, the face cover plastic should be one which is capable of maintaining a molded shape under ordinary environmental conditions and which present an appropriate surface appearance upon molding, such as one suitable for plating or coating. Plastics suitable for use in the face cover are known in the art and include ABS copolymer resins, polyesters, polyamides, polycarbonates, polyester-polycarbonate copolymers and alloys and blends thereof, such as ABS/polycarbonate alloys, ABS/polyester alloys and ABS/nylon alloys. The face cover plastic may additionally include additives such as ultraviolet light stabilizers, fillers, antioxidants and other additives indicated above for the reinforcing beam.

The thickness desirable for the face cover will vary depending upon the face cover material selected, whether the face cover is to be painted or coated, and other factors, it is generally preferred that the face cover be about 0.08 in. to about 0.2 in. thick.

Referring to FIG. 2, face cover 12 may be attached to reinforcing beam 14 by any of a variety of attachment means, such as by an adhesive 50 disposed between face cover 12 and reinforcing beam 14. Suitable adhesives are known in the art, including acrylate, neoprene, polyurethane, epoxies, RTV silicones and polysulfide adhesives. In addition to or instead of an adhesive, reinforcing beam 14 may be affixed to face cover 12 by means of one or more snap fittings such as snap fitting 44 shown in FIG. 5 which engages the reinforcing beam 14 through snap fitting aperture 21 which traverses beam wall 16. Other viable means for attaching the face cover to the beam inlcude mechanical fasteners and solvent welding.

The present invention also includes a process for making the bumper assembly of the present invention. According to the invention, a first material is molded, preferably by injecting molding of a plastic material, to form the face cover. However, whereas other thermoplastic structural bumper components have been made by injection molding a plurality of structural parts and fastening them together, the reinforcing beam of the present invention is made in one piece by extruding a second material to form a tubular—and preferably substantially cylindrical—section. The tubular section is then taken, preferably while still hot from the extruder, placed inside a mold and blow molded by introduction of air inside the lumen of the tubular section to form the reinforcing beam.

The first material, employed for the face cover, and the second material, employed for the reinforcing beam, are selected as described above for the bumper assembly. As is readily apparent, when the face cover is made by injection molding the first material will be a thermoplastic. In any event, the second material will be thermoplastic material and may be the same as or different from a thermoplastic material selected for the face cover.

The mold for the reinforcing beam is such that upon blow molding, the tubular section is molded into a reinforced beam which preferably is adapted for attaching the reinforcing beam to a vehicle, such as by causing a first portion of the tubular wall to deform toward a second portion of the wall to form a mounting rib. Bolt holes may also be provided by the inclusion of spindles or pins at desired placed in the mold so that upon blow molding the pins pierce the tubular wall. Reinforcing means, such as a reinforcing rib, may also be provided by employing a mold with a configuration such that blow molding of the tubular section causes a third portion of the tubular wall to approximate a fourth portion of the wall.

Following molding, the face cover is attached to the reinforcing beam, preferably by at least one of pressing the reinforcing beam into snap fittings on the inside of the face cover, and/or by disposing an adhesive on an outside surface of the reinforcing beam or the inside of the face cover and bringing the two parts in contact with the adhesive between them. Although the face cover may be attached to the reinforcing beam after the beam has been affixed to a vehicle, it is preferred that the bumper parts be assembled before attachment to a vehcile.

The bumper assembly may affixed to a vehicle by attaching the reinforcing beam to the vehicle body, either directly or through a shock absorber system. For example, referring to FIG. 3, the reinforcing beam may be attached to a vehicle by threadingly engaging bolt 52 with nut 30 through bolt hole 54 in mounting rib 26. In an alternative embodiment shown in FIG. 4, a threaded stud or bolt 56 may be mounted in pocket 58 and engage a nut (not shown) or, if bolt 56 is self-tapping, may engage the vehicle directly.

Fastening means such as nut 30 may be fixedly positioned such as by imbedding nut 30 in the first portion 22 of wall 16 during blow molding of the reinforcing beam, or by making nut 30 part of a metal bracket 60 which acts to locally reinforce wall 16 as well as to prevent rotation of nut 30 while tightening bolt 52. In an embodiment wherein the face cover has not yet been attached or wherein a pocket such as pocket 28 communicates to outside the assembly, nut 30 may be manually held in position while bolt 52 is fastened, although this is not preferred.

It will be understood that various changes and modifications may be made in the embodiments outlined above without departing from the spirit of the invention, which includes all equivalents and modifications thereof and is limited only by the following claims.

I claim:

1. A vehicle bumper assembly comprising a substantially tubular reinforcing beam having a single substantially continuous wall, a face cover, and means for attaching said face cover to said reinforcing beam, wherein said reinforcing beam has a cross-sectional configuration which varies along the length of said beam, and wherein said beam includes a thermoplastic material which has a flexural modulus at 72° F., according to ASTM Standard D-730 (0.05 in./min.), of about 100,000 psi to about 500,000 psi and a deflection temperature according to ASTM Standard D-698 (268 psi), ¼" thick samples of at least 155° F.

2. The vehicle bumper assembly of claim 1 wherein said reinforcing beam includes a material which has a flexural modulus of 72° F., according to ASTM Standard D-790 (0.05 in./min), of about 200,000 to about 400,000.

3. The bumper assembly of claim 1 wherein said reinforcing beam includes a material which has a deflection temperature of at least 180° F.

4. The vehicle bumper assembly of claim 2 wherein said substantially tubular reinforcing beam includes a tubular wall having a thickness of about 0.1 in. to about 0.25 in.

5. The vehicle bumper assembly of claim 1 wherein said face cover includes a material which has a flexural modulus according to ASTM Standard D-790 (0.05 in./min) at 72° F. of about 75,000 psi to about 500,000 psi.

6. The bumper assembly of claim 5 wherein said face cover includes a material which has a deflection temperature according to ASTM Standard D-648 (264 psi) of ¼" thick samples at least 155° F.

7. The vehicle bumper assembly of claim 5 wherein said face cover has a thickness of about 0.08 in. to about 0.2 in.

8. The vehicle bumper assembly of claim 1 wherein a first portion of the tubular wall of said reinforcing member approximates a second portion of said wall to form a mounting rib, and said first portion and said second portion of said wall are adapted to receive a means for attaching said reinforcing beam to a vehicle.

9. The vehicle bumper assembly of claim 8 wherein a third portion of the wall of said reinforcing beam approximates a fourth portion of said wall to form a reinforcing rib.

10. The vehicle bumper assembly of claim 1 wherein said reinforcing beam communicates directly to the external atmosphere.

11. The vehicle bumper assembly of claim 1 wherein said means for attaching said face cover to said reinforcing beam is an adhesive disposed between said face cover and said reinforcing beam.

12. The vehicle bumper assembly of claim 1 wherein said face cover is attached to said reinforcing beam by means of a snap fitting.

13. The vehicle bumper assembly of claim 1 wherein said assembly consists essentially of a substantially tubular reinforcing beam, a face cover, and means for attaching said face cover to said reinforcing beam.

* * * * *